United States Patent
Van Vlassenrode

(10) Patent No.: US 11,325,347 B2
(45) Date of Patent: May 10, 2022

(54) FLOOR PANELS

(71) Applicant: IVC, BV, Avelgem (BE)

(72) Inventor: Kristof Van Vlassenrode, Deinze (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 16/972,074

(22) PCT Filed: May 9, 2019

(86) PCT No.: PCT/IB2019/053808
§ 371 (c)(1),
(2) Date: Dec. 4, 2020

(87) PCT Pub. No.: WO2019/234521
PCT Pub. Date: Dec. 12, 2019

(65) Prior Publication Data
US 2021/0237397 A1    Aug. 5, 2021

(30) Foreign Application Priority Data

Jun. 6, 2018  (BE) .................................. 2018/5375

(51) Int. Cl.
*E04B 2/00* (2006.01)
*B32B 7/023* (2019.01)
(Continued)

(52) U.S. Cl.
CPC ................ *B32B 7/023* (2019.01); *B32B 3/06* (2013.01); *B32B 5/245* (2013.01); *B32B 27/08* (2013.01);
(Continued)

(58) Field of Classification Search
CPC .......... E04F 15/02033; E04F 15/02038; E04F 15/107; E04F 15/102; E04F 2201/042;
(Continued)

(56) References Cited

U.S. PATENT DOCUMENTS 8,549,807 B2 * 10/2013 Meersseman ............. B32B 7/12
52/313
8,925,275 B2 * 1/2015 Meersseman ......... B32B 27/304
52/588.1

(Continued)

FOREIGN PATENT DOCUMENTS

WO        9747834 A1    12/1997
WO    2011129757 A1    10/2011
(Continued)

OTHER PUBLICATIONS

ISR and Written Opinion in corresponding PCT Application No. PCT/IB2019/053808, dated Aug. 7, 2019.

*Primary Examiner* — Chi Q Nguyen
(74) *Attorney, Agent, or Firm* — Workman Nydegger

(57) ABSTRACT

A floor panel including a top layer and a substrate, where the substrate at least one first layer of a first thermoplastic material and a second layer of a second thermoplastic material, where the second layer is adjacent to a first side of the first layer. The first layer is characterized by a first colour with luminance value L1 in the HSL colour space and the second layer is characterized by a second colour with luminance value L2 in the HSL colour space, where L1 is different from L2.

25 Claims, 5 Drawing Sheets

(51) Int. Cl.
*B32B 3/06* (2006.01)
*B32B 5/24* (2006.01)
*B32B 27/08* (2006.01)
*B32B 27/30* (2006.01)
*E04F 15/02* (2006.01)
*E04F 15/10* (2006.01)

(52) U.S. Cl.
CPC ...... *B32B 27/304* (2013.01); *E04F 15/02038* (2013.01); *E04F 15/105* (2013.01); *E04F 15/107* (2013.01); *B32B 2262/101* (2013.01); *B32B 2266/0235* (2013.01); *E04F 15/02033* (2013.01); *E04F 2201/0153* (2013.01); *E04F 2201/023* (2013.01); *E04F 2201/043* (2013.01)

(58) Field of Classification Search
CPC .......... E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; E04F 15/105; E04F 2201/0161; B32B 5/022; B32B 7/023; B32B 5/245; B32B 3/06; B32B 27/304; B32B 27/08; B32B 5/18; B32B 2471/00; B32B 2262/101; B32B 2266/0235
USPC .. 52/592.1, 592.3, 592.2, 578, 588.1, 309.1, 52/309.3
See application file for complete search history.

(56) References Cited

U.S. PATENT DOCUMENTS

| | | | | |
|---|---|---|---|---|
| 9,793,995 | B2* | 10/2017 | Lozhkin | H04L 27/367 |
| 10,094,123 | B2* | 10/2018 | Meersseman | B32B 3/06 |
| 11,091,919 | B2* | 8/2021 | Van Vlassenrode | B32B 5/022 |
| 2013/0067842 | A1* | 3/2013 | Meersseman | B44C 1/24 |
| | | | | 52/309.4 |
| 2013/0104478 | A1* | 5/2013 | Meersseman | B32B 3/06 |
| | | | | 52/309.1 |
| 2015/0121793 | A1* | 5/2015 | Segaert | B29C 43/48 |
| | | | | 52/506.01 |
| 2015/0343739 | A1* | 12/2015 | Pervan | B32B 37/1027 |
| | | | | 52/582.1 |
| 2015/0368912 | A1* | 12/2015 | Baert | B32B 23/048 |
| | | | | 52/309.15 |
| 2016/0193857 | A1* | 7/2016 | De Mondt | E04F 15/02038 |
| | | | | 52/311.1 |
| 2016/0200092 | A1* | 7/2016 | Doehring | E04C 2/34 |
| | | | | 52/588.1 |
| 2019/0153734 | A1* | 5/2019 | Van Vlassenrode | B29C 44/30 |

FOREIGN PATENT DOCUMENTS

| | | |
|---|---|---|
| WO | 2013026559 A2 | 2/2013 |
| WO | 2013178561 A2 | 12/2013 |
| WO | 2013179261 A1 | 12/2013 |
| WO | 2014006593 A1 | 1/2014 |
| WO | 2014065953 A1 | 5/2014 |
| WO | 2018087638 A1 | 5/2018 |
| WO | 2018093098 A1 | 5/2018 |

* cited by examiner

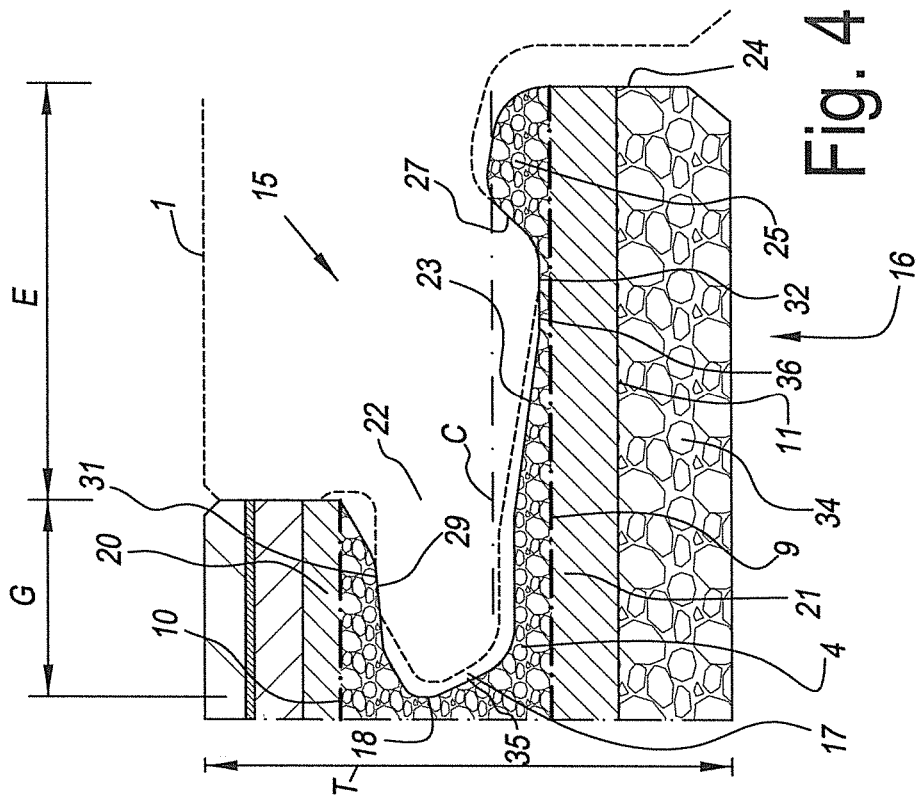
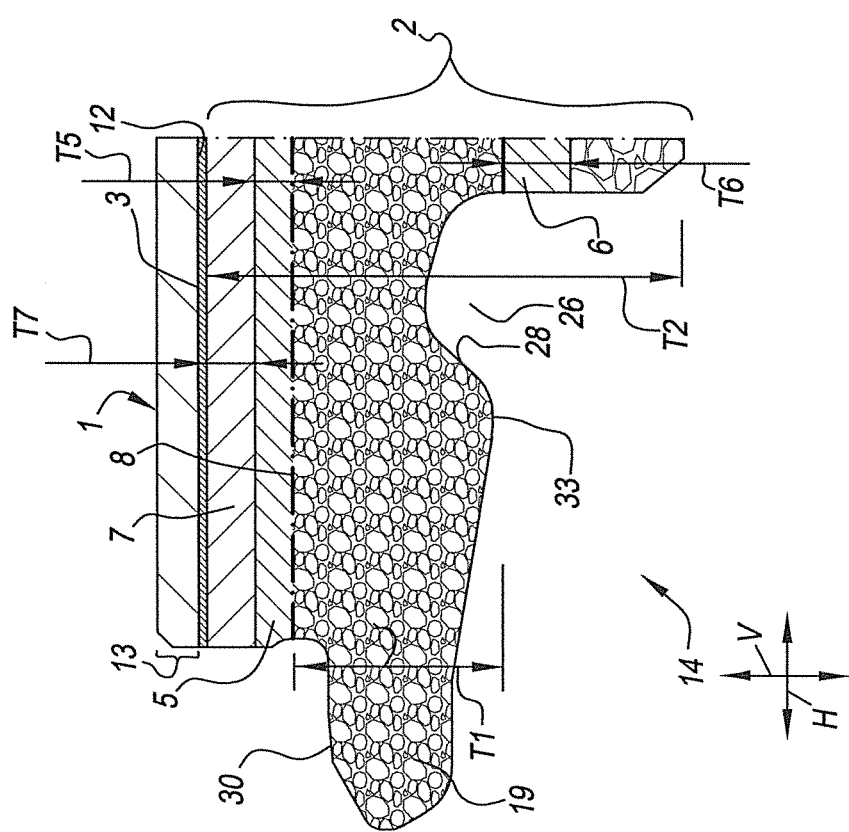
Fig. 4

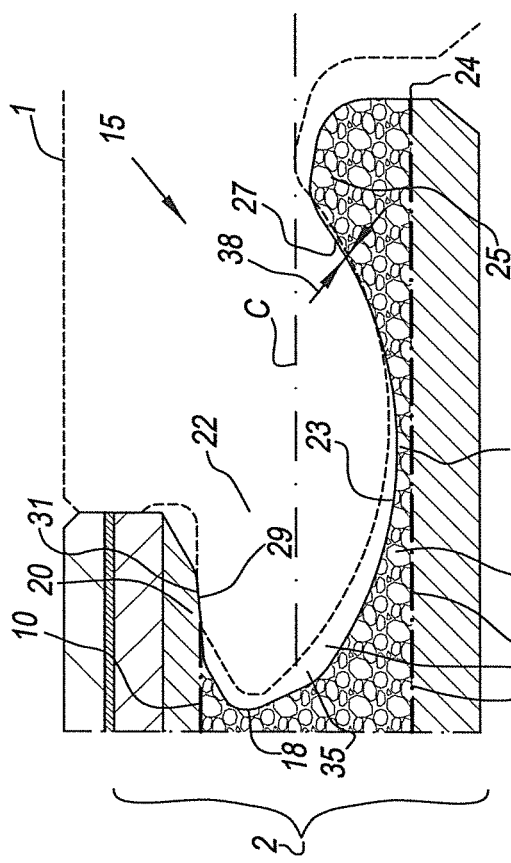
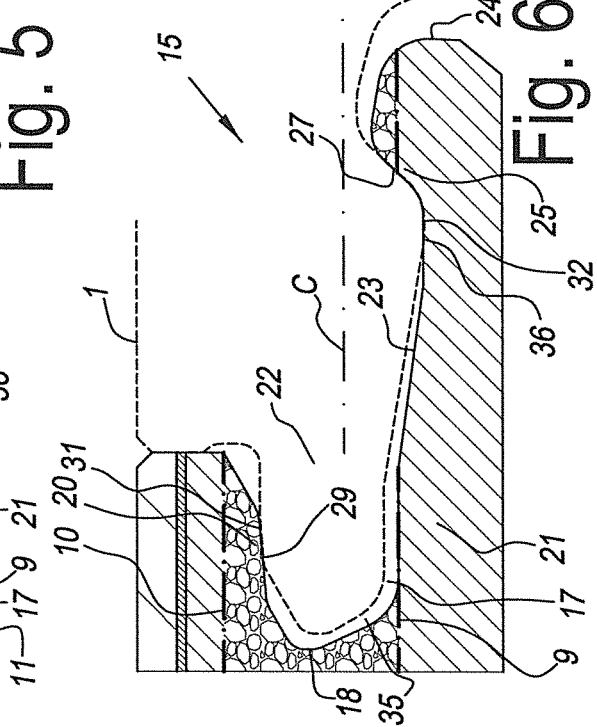
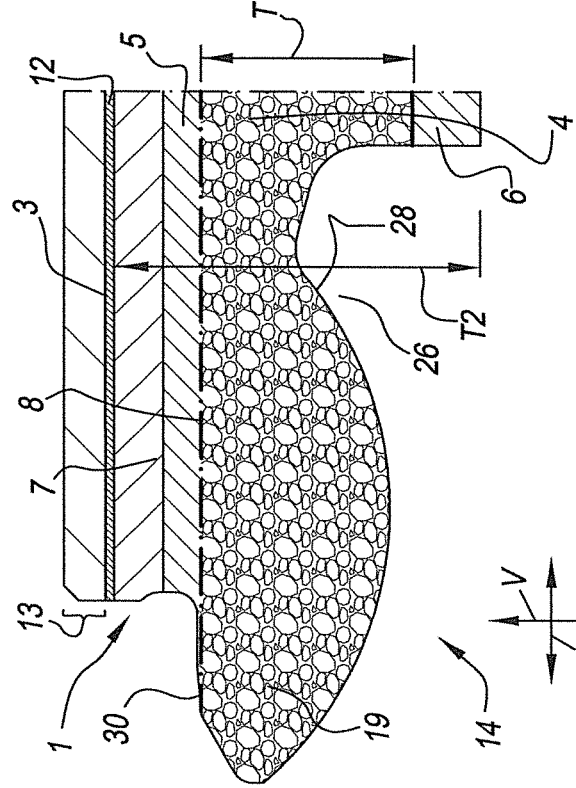
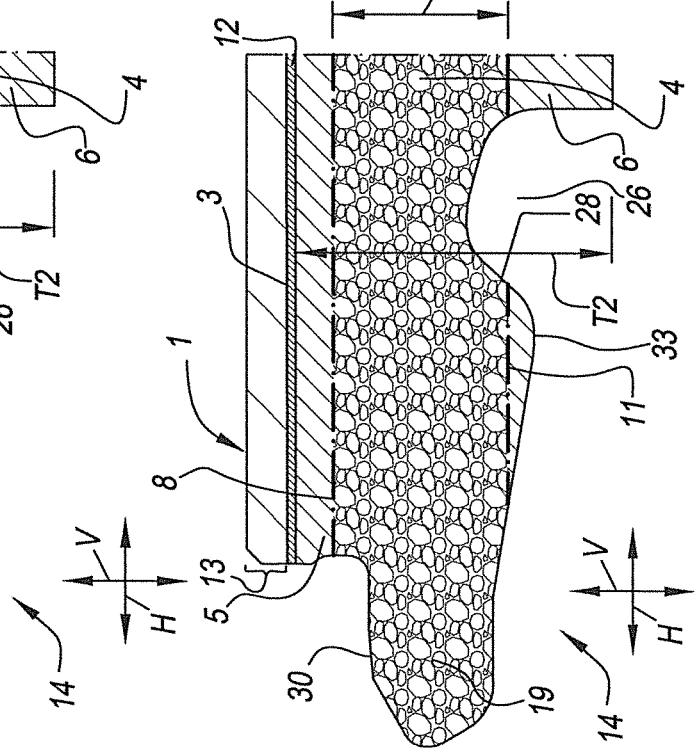

FLOOR PANELS

TECHNICAL FIELD

The present invention relates to floor panels.

BACKGROUND OF THE INVENTION

The invention relates more particularly to a floor panel with a substrate and a decoration applied thereon. Floor panels of this kind are widely known per se for example in the form of MDF or HDF panels with a printed decoration, such as the laminate panels in WO 97/47834, in the form of vinyl panels, such as in WO 2013/026559, or in the form of so-called WPC (Wood Plastic Composite) panels with a vinyl top layer, such as in WO 2014/065953.

In the case of WO 2013/026559 they are waterproof floor panels with a substrate of soft or flexible polyvinyl chloride or PVC. In addition, the decoration and the PVC finishing layer applied on top of it offer pleasant walking comfort without a pronounced tapping noise, such as may certainly be the case with laminate panels. However, with the floor panels from WO'559 there is a risk of "telegraphing" effects. The result is that with the passage of time, irregularities in the substrate become visible on the surface of the floor covering, which is unattractive. Furthermore, floor panels of this kind are relatively difficult to install, because they easily bend or deform, owing to the flexibility of the carrier. The soft substrate is susceptible to dimensional changes with temperature fluctuations. Problems may arise with local warming of the floor covering, for example under direct sunlight near a window. Expansion of the elements may occur at these points. The limited stiffness of the floor panels means that the floor covering may camber locally. Any coupling means that are present, such as a locking tongue-and-groove, display only limited strength. The soft finishing layer is susceptible to scratching and staining, even when a UV-cured varnish surface coat is also applied on top of the PVC finishing layer. A varnish surface coat of this kind is of limited effectiveness, since it might well have already worn away in the initial years of use.

WO 2013/026559 to some extent offers a solution for the problems with the dimensional stability of a substrate of flexible PVC. By using a reinforcing layer impregnated with PVC, more particularly a glass-fibre mat impregnated with flexible PVC, with a weight of 65 grams per square metre, improved interaction is obtained between the substrate and the glass-fibre layer, as well as a limited improvement in dimensional stability with temperature fluctuations.

WO 2014/006593 relates to floor panels with a substrate of extruded plastic composite with a finishing layer, for example a vinyl top layer, as decoration. The plastic composite may for example be obtained from on the one hand high-density polyethylene (HDPE), or PVC, and on the other hand bamboo, wood and/or cork material. The substrate is rigid and gives a reduced risk of the aforementioned telegraphing effects. In addition, optional coupling parts may be provided in this stronger substrate. However, extruded substrates of this kind tend to deform or bend and the dimensional stability is at the same level as the vinyl panels from the aforementioned WO'559.

SUMMARY OF THE INVENTION

The present invention relates firstly to an alternative floor panel, wherein according to the preferred embodiments a solution is offered for one or more problems with the floor panels from the prior art.

According to a first aspect of the invention, a floor panel is provided, said floor panel comprising at least a substrate and a top layer, said substrate comprising at least one first layer of a first thermoplastic material and a second layer of a second thermoplastic material, wherein the second layer is adjacent to a first side of the first layer, characterized in that the first layer is characterized by a first colour with luminance value L1 in the HSL colour space and the second layer is characterized by a second colour with luminance value L2 in the HSL colour space, wherein L1 is different from L2.

The top layer provides the upper side of the panel. The substrate is located under the top layer.

The first layer and the second layer are thus in contact with each other on one side, namely in direct contact, wherein one side of the first layer touches one side of the second layer. Preferably, the first and second layer, as well as any further layers of the substrate, have a uniform thickness over their surface.

The HSL colour space means the cylindrical representation of colours on the basis of H being the tint or "hue", which is represented as an angle between 0° and 360° (with 0° primary red, 120° primary green and 240° primary blue), S being the saturation value (or saturation), which varies between 0 and 100, wherein S=0 is no saturation and S=100 is complete saturation, and the L value being the brightness (or lightness or luminance), which varies between 0 and 100, wherein L=0 represents black and L=100 represents white.

According to some embodiments, the absolute value of this difference in luminance (|L1-L2|) is less than or equal to 50, more specifically less than or equal to 40, even less than or equal to 30 such as less than or equal to 20.

The absolute value of L1-L2 is preferably greater than or equal to 5. The absolute value of this difference in luminance (|L1-L2|) is preferably greater than or equal to 8, more specifically greater than or equal to 10.

According to some embodiments L2 is less than L1.

According to some embodiments the largest of L1 and L2 is less than or equal to 85.

The luminance value for both colours is preferably less than or equal to 85, such as less than or equal to 75, for example less than or equal to 50.

According to some embodiments the second layer is positioned under the first layer in the floor panel.

The second layer may optionally provide the floor panel with its lower surface. In an alternative embodiment, under the second layer there are also layers of thermoplastic or other material, which among other things provides the lower surface or the lower side of the floor panel with functionalities.

According to some embodiments the first colour has a saturation value S1 in the HSL colour space and the second layer a saturation value S2 in the HSL colour space, where S1 and S2 are each less than or equal to 25.

Preferably, each of the saturation values S1 and S2 is less than or equal to 10, even less than or equal to 5.

According to some embodiments the hue of the first colour is characterized by an angle H1 in the HSL colour space and the hue of the second colour is characterized by an angle H2 in the HSL colour space, where the smaller angle between H1 and H2 is less than or equal to 175°

Preferably the smaller angle between H1 and H2 is less than or equal to 170°, even less than or equal to 160°.

According to some embodiments the thermoplastic material of the first layer is PVC. According to some embodiments the thermoplastic material of the second layer is PVC.

For each of the thermoplastic PVC (polyvinyl chloride) materials of the first and of the second layer, independently of one another, the PVC material may be provided with plasticizers, for example an amount of less than 12 phr of the thermoplastic material may be plasticizers, for example between 1 and 6 phr. For example, independently of one another, the PVC material may be provided with plasticizers; an amount of less than 20 wt % of the thermoplastic material may be plasticizers, for example between 0 and 15 wt %.

The plasticizers may among other things be esters of carboxylic acids (for example esters of iso- or terephthalic acid, trimellitic acid and adipic acid), for example diisononyl phthalate (DINP), dioctyl terephthalate (DOTP), diisononyl-1,2-cyclohexanedicarboxylate (DINCH), esters of phosphoric acid, for example triaryl- or trialkaryl phosphates, for example tricresyl phosphate, chlorinated or unchlorinated hydrocarbons, ethers, polyesters, polyglycols, sulphonamides, or combinations thereof. In an alternative embodiment, one of the two PVC layers does not have any plasticizers, and is thus plasticizer-free. In yet another alternative embodiment, both the first layer and the second layer are made of plasticizer-free PVC. The aforementioned percentage by weight (wt %) is expressed as the weight of the element relative to the weight of the thermoplastic material in which the element is located.

For each of the thermoplastic PVC materials of the first and second layer, independently of one another, the PVC material may be provided with fillers, for example an amount of at least 30 phr of the thermoplastic material may be fillers. Fillers may be, among other things, glass fibres, calcium hydroxide (slaked lime), calcium carbonate and calcium hydrogen carbonate, talc, or also light-weight fillers such as hollow microspheres (Expancel). The aforementioned percentage by weight (wt %) is expressed as the weight of the filler relative to the weight of the thermoplastic material in which the filler is located.

For each of the thermoplastic PVC materials of the first and second layer, independently of one another, the colour of the thermoplastic material may be provided with one or more organic or inorganic dyes or organic or inorganic pigments, for example carbon black pigment, which often largely determines the luminance value.

According to some embodiments, at least one reinforcing element is provided at least in one of the first and second layer, or between the first and second layer.

Said reinforcing element may for example be glass-fibre cloth, for example woven or non-woven glass-fibre cloth. Said cloth may have a weight per unit area of at least 30 g/m$^2$ but preferably a weight per unit area of less than 100 g/m$^2$. The weight per unit area is preferably between 35 and 75 g/m$^2$, for example such as between 35 and 65 g/m$^2$, for example such as 50 g/m$^2$.

Both the first and the second layer may be provided with at least one reinforcing element individually.

If several reinforcing elements are provided, for example several said glass-fibre cloths, then the combined weight per unit area for these elements per unit area of the floor panel is preferably less than 150 g/m$^2$.

According to some embodiments, at least one of the first layer and second layer is a chemically or mechanically foamed layer.

Preferably the first layer is foamed and the second layer is not foamed.

A foamed layer means a layer that contains hollow spaces, preferably in an amount such that the density of the material is reduced by at least 10%, and preferably even at least 25% relative to the weight of an identical volume of thermoplastic material without hollow spaces. Preferably it relates to so-called "closed-cell" foam. Non-foamed layer means a layer without hollow spaces, or at most with a proportion of hollow spaces such that the density of the material does not decrease, or not more than 10%, and preferably even not more than 2%.

In general it should also be noted that, in the context of the invention, a foamed layer need not necessarily be foamed in a uniform manner. It is possible that the foamed layer comprises a proportion of hollow spaces that varies through its thickness. Thus, for example, the highest proportion may be reached at the centre of the layer, whereas on one or more of the surfaces of such a layer there may be zones that are less foamed or even are not foamed.

The foamed layer may be obtained in various possible ways, the three main possibilities being enumerated hereunder.

According to a first possibility, the foamed layer is obtained at least by means of a mechanical foaming process. This signifies that in the layer in question, cavities are formed by pushing the thermoplastic material away and replacing it with a gas (for example air), often under the influence of mechanical action or by blowing-in a gas (for example air) under pressure. Or it may be obtained by using expanding granules in a PVC-based layer.

According to a second possibility the foamed layer is obtained at least by means of a chemical foaming process. This means that in the layer in question cavities are formed by means of a gaseous reaction product. For example, azodicarbonamide may be used. This substance releases nitrogen gas when heated, and this remains in the form of bubbles in the foamed layer.

According to a third possibility, the foamed layer is obtained at least by means of fillers, wherein these fillers in themselves comprise one or more cavities. It is for example possible to make use of the expanded state of the microspheres mentioned above. More particularly, it is possible to use the microspheres known from WO 2013/178561.

According to some embodiments, the panel comprises one or more further layers of thermoplastic material, all of which are located on the second side of the first layer in the floor panel, wherein each of the one or more further layers of thermoplastic material is characterized individually by a luminance value $Lx$.

According to some embodiments, for each of the one or more layers the colour has a luminance value $Lx$ that is different from $L1$.

According to some embodiments, the colour of at least one of the one or more layers has a luminance value $Lx$ equal to $L2$.

According to some embodiments, each of the one or more further layers of thermoplastic material is characterized individually by a saturation value $Sx$, wherein each $Sx$ is less than or equal to 25.

According to some embodiments, each of the one or more further layers of thermoplastic material is characterized individually by a hue with angle $Hx$, wherein the smaller angle between $H1$ and each of the $Hx$ is less than 175°.

According to some embodiments, the largest of $L1$, $L2$ and all $Lx$ is less than or equal to 85.

Although the colour differences may be detected by means of any suitable optical system, the values H, S and L are measured using a spectrophotometer, for example Datacolor 500. The settings selected for the colour measurement are light source D65 and diffuse light, measurement at an angle of 10° with an opening of 30 mm (LAV), with a white background and without taking gloss or structure difference into account (Reflectance Specular Included (RSIN)).

According to some embodiments, all of the one or more further layers of thermoplastic material are located between the second side of the first layer of thermoplastic material and the upper surface of the floor panel.

The different layers of thermoplastic material may be produced in various different ways, and may be fastened to one another by means of a thermal lamination process. If the layers of thermoplastic material comprise a foamed layer or layers, they are preferably fastened to the other layer or layers by means of a glued joint.

Preferably, one or more of the thermoplastic layers are obtained by spreading and consolidating at least the aforementioned thermoplastic material whether or not in the form of granules. Processing by spreading for making floor panels is known per se, for example from WO 2013/179261.

According to some embodiments, the top layer of the panel comprises a decorating layer or decoration layer, said decorating layer being located between the layers of thermoplastic material and the upper surface of the floor panel. According to some embodiments the decorating layer comprises a printed pattern.

According to some embodiments, the decorating layer comprises a thermoplastic film, preferably PVC film. According to some embodiments the film is provided with a decorative print. According to some embodiments the printed pattern is an ink-jet-printed pattern. According to some embodiments the printed pattern is an ink-jet-printed pattern that is printed on the upper side of the uppermost of the first, second or one of the several layers of thermoplastic material.

If applicable, the upper side of the uppermost of the first, second or one of the several layers of thermoplastic material is provided with a priming coat, for example obtained on the basis of a white PVC plastisol.

Preferably the printed pattern is a pattern of wood grain and/or stone. Preferably the floor panel shows the pattern of just one wooden board.

Although the preference is for printed patterns, it is not excluded that the decoration could be formed by for example real wood veneer or real stone veneer, or by a consolidated mixture of powders, for example PVC powders or PVC granules.

According to some embodiments the top layer of the panel further comprises a transparent or translucent wearing layer applied on the decorating layer. Preferably said wearing layer consists essentially of thermoplastic material, preferably PVC, for example with a thickness between 0.15 and 0.75 millimetre.

According to some embodiments the wearing layer comprises a varnish coat adjacent to the surface.

Examples of usable varnish coats are varnish coats based on urethane acrylates, polyester acrylates and/or epoxide acrylates. Preferably they are varnish coats that are cured using UV radiation or excimer radiation. The varnish coat in question may comprise hard particles, for example of aluminium oxide and/or silica for obtaining increased wear resistance.

According to some embodiments the panel is provided with a relief on its upper surface.

If a decorating layer has been provided, the relief may relate to the pattern that is shown in the decorating layer. The relief is then in register with the pattern.

The floor panel may thus comprise a wearing layer, a coating and two or more thermoplastic layers, as well as an undercoat that provides the underside of the floor panel with functionalists. All layers that are located between the underside of the floor panel and the decorating layer, thus including the layer that is provided on the underside, are part of the substrate.

If the floor panel comprises one or more foamed layers, these foamed layers preferably provide at least 30% of the thickness of the substrate, and preferably even 40% or more. Preferably this foamed layer or these foamed layers provide 30 to 70% of the thickness of the floor panel, and 25 to 65% of the thickness of the substrate. Preferably the foamed layer or layers are located centrally in the substrate.

The floor panels of the invention may preferably be used for making a floating floor covering. For this purpose they may be provided on one or more edges with profiling. The layered structure of the floor panels of the invention may display various synergistic effects with the concrete design of said profiling. A number of preferred characteristics of said profiling are stated hereunder.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, wherein at least one of the aforementioned edges is provided with a groove, the deepest point of which is located in the aforementioned first layer.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, wherein at least one of the aforementioned edges is provided with a groove, the deepest point of which is located in the aforementioned second layer.

According to some embodiments, the floor panel in question is provided, on at least two opposite edges, with coupling means that allow two such floor panels (1) to be coupled together, wherein on the edges in question, locking is brought about at least in a horizontal direction (H) in the surface of the panels and perpendicular to the edges, wherein at least one of the aforementioned edges is provided with a hook-shaped locking part directed upwards, wherein the aforementioned locking part extends at least partially into the first layer.

In some embodiments the upwards-directed hook-shaped locking part extends into the first layer completely.

According to some embodiments, the floor panel in question is provided, on at least two opposite edges, with coupling means that allow two such floor panels to be coupled together, wherein on the edges in question, locking is brought about at least in a horizontal direction (H) in the surface of the panels and perpendicular to the edges, wherein at least one of the aforementioned edges is provided with a hook-shaped locking part directed upwards, wherein the aforementioned locking part extends at least partially into the second layer.

In some embodiments the upwards-directed hook-shaped locking part extends into the second layer completely.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, wherein at least one of the aforementioned edges is provided with a groove, wherein this groove is flanked by an upper lip and a lower lip and wherein the upper surface of the lower lip is formed at least partially in the first layer. According to some embodiments the aforementioned upper surface of the lower lip is also formed at least partially in the second layer.

In some embodiments the upper surface of the lower lip is formed wholly in the first layer. In some embodiments the upper surface of the lower lip is formed wholly in the second layer.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, wherein at least one of the aforementioned edges is provided with a groove, wherein this groove is flanked by an upper lip and a lower lip and wherein the lower surface of the upper lip is formed at least partially in the first layer.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, wherein at least one of the aforementioned edges is provided with a groove, wherein this groove is flanked by an upper lip and a lower lip and wherein the lower surface of the upper lip is formed at least partially in the second layer.

In some embodiments the lower surface of the upper lip is formed wholly in the first layer. In some embodiments the lower surface of the upper lip is formed wholly in the second layer.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, as well as in a horizontal direction (H) in the surface of the floor panels and perpendicular to the edges in question, wherein the aforementioned locking in the vertical direction (V) is provided by at least one pair of interacting contact surfaces partly formed in the first layer, whereas the aforementioned locking in the horizontal direction (H) is provided by at least one pair of interacting contact surfaces partly formed in the second layer.

In some embodiments the locking in the vertical direction (V) is provided by at least one pair of interacting contact surfaces that are formed wholly in the first layer. In some embodiments the locking in the horizontal direction (H) is provided by at least one pair of interacting contact surfaces that are formed wholly in the second layer.

According to some embodiments the floor panel in question is provided, on at least two opposite edges, with coupling means that allow two such floor panels to be coupled together, wherein on the edges in question, locking is brought about at least in a vertical direction (V) perpendicular to the surface of the panels, as well as in a horizontal direction (H) in the surface of the floor panels and perpendicular to the edges in question, wherein the aforementioned locking in the vertical direction (V) is provided by two pairs of interacting contact surfaces, wherein a first pair is formed at least partly in the first layer, whereas a second pair is formed at least partly in the first layer the second layer.

In some embodiments a first pair is formed wholly in the first layer. In some embodiments a second pair is formed wholly in the second layer.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, wherein at least one of the aforementioned edges is provided with a tongue, said tongue being formed at least partially in the first layer.

According to some embodiments, the floor panel in question is provided, on at least two opposite edges, with coupling means that allow two such floor panels to be coupled together, wherein on the edges in question, locking is brought about at least in a vertical direction (V) perpendicular to the surface of the panels, wherein at least one of the aforementioned edges is provided with a tongue, said tongue also being formed at least partially in the second layer.

In some embodiments the tongue is made wholly in the first layer. In some embodiments the tongue is made wholly in the second layer.

A person skilled in the art will understand that in some embodiments some of the aforementioned surfaces or parts of the groove or parts of the tongue may be made in one or more of the further layers of thermoplastic material.

The floor panels according to the invention have, among other things, the advantage that the grooves and tongues, which are generally formed on the edges by milling, sawing or grinding, and which are visible on the floor panel before or during fitting in a floating floor covering, show less colour difference between the zones made from different layers. This is because the coloured layers have a tendency, through milling, grinding or sawing, to show a lighter colour on the surface, and more so for darker than for lighter colours. As a result, the transition between a lighter and a darker zone will be less visually perceptible.

Moreover, if a part or surface of the coupling means should be formed in the first layer, but the perimeter of the shape is very close to the boundary of the two layers, a slight deviation of the shape may ensure that a particle of or a small piece of the surface of the coupling means is instead formed in the other layer. Fading of the colours, and more fading of the darker colour than the lighter colour, will ensure a uniform colour effect along the part or surface of the coupling means. Thus, slight deviations from the intended ideal profile are less visually perceptible.

The independent and dependent claims present specific and preferred features of the embodiments of the invention. Features of the dependent claims may be combined with features of the independent and dependent claims, in any suitable manner that would be obvious to a person skilled in the art.

The aforementioned and other features, properties and advantages of the present invention will be explained by means of the following examples of embodiments, optionally in conjunction with the drawings.

The description of these embodiment examples is given as an explanation, without the intention of limiting the scope of the invention. The reference numbers in the description given hereunder refer to the drawings. The same reference numbers in different figures refer to identical or equivalent elements.

BRIEF DESCRIPTION OF THE FIGURES

For better demonstration of the features of the invention, some preferred embodiments are described hereunder, as examples without any limiting character, referring to the appended drawings, in which:

FIGS. 2 to 6 show, on a larger scale, a section along line II-II indicated in FIG. 1.

DETAILED DESCRIPTION OF THE INVENTION

The present invention is described below on the basis of specific embodiments.

It should be pointed out that the term "comprising", as used for example in the claims, is not to be interpreted in a limiting sense, limiting to the elements, features and/or steps that then follow. The term "comprising" does not exclude the presence of other elements, features or steps.

Thus, the scope of an expression "an object comprising the elements A and B" is not limited to an object that only contains the elements A and B. The scope of an expression "a method comprising the steps A and 8" is not limited to a method that only contains the steps A and B.

In the light of the present invention, these expressions only signify that the relevant elements or steps for the invention are the elements or steps A and B.

In the following specification, reference is made to "an embodiment" or "the embodiment". Such a reference signifies that a specific element or feature, described on the basis of this embodiment, is comprised in at least this one embodiment.

The occurrence of the terms "in an embodiment" or "in an embodiment" at various points in this description does not, however, necessarily refer to the same embodiment, although it may well refer to one and the same embodiment.

Moreover, the properties or the features may be combined in any suitable manner in one or more embodiments, as would be obvious to a person skilled in the art.

Figure 1:
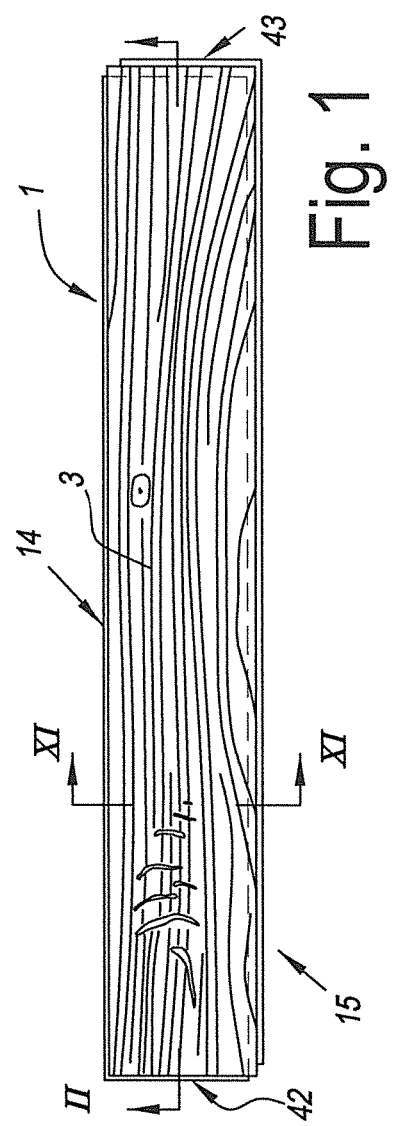
FIG. 1 shows a floor panel with the features of the invention.

FIG. 1 shows a rectangular floor panel 1.

FIG. 2 to FIG. 6, in their cross-section along I-II in FIG. 1, clearly show that the floor panel 1 comprises a substrate 2 and a decorating layer or decoration 3 applied thereon. Sections in FIG. 1 along XI-XI show identical profiles and edges 42 and 43. The decoration 3 and the wearing layer 13 together form the top layer.

The substrate 2 comprises a first layer, in this case a foamed layer, 4 made of thermoplastic material, in this case polyvinyl chloride (PVC). This foamed layer 4 is positioned in such a way that it is located at least centrally in the substrate 2, namely on the centre line C. In this case the thickness T1 of the foamed layer represents more than 40% of the thickness T2 of the substrate. In the embodiments described hereunder, in each case reference will be made to a foamed first layer 4. As alternatives, in each case the first layer 4 need not be foamed.

The floor panel 1 comprises in its substrate 2 a second layer 6, which is applied on the underside of the first layer 4.

Moreover, the substrate 2 comprises in this case layers 5 and 7 that are not yet foamed, and an additional foamed layer 34.

The following Table I specifies the colours in the HSL colour space of a first example A.

TABLE I

| Layer # | CIE Lab | | | HSL | | | |
|---|---|---|---|---|---|---|---|
| | L | a | b | H | S | L | |
| 7 | 27.89 | 0.16 | 0.2 | 0.00 | 0.76 | 25.69 | Further layer |
| 5 | 30.46 | 0.11 | 0.11 | 0.00 | 0.00 | 27.83 | Further layer |
| 4 | 43.58 | −0.57 | −2.66 | 210.00 | 3.88 | 40.39 | First layer |
| 6 | 30.46 | 0.11 | 0.11 | 0.00 | 0.00 | 27.83 | Second layer |
| 34 | 43.58 | −0.57 | −2.66 | 210.00 | 3.88 | 40.39 | Further layer |

Regarding the first and second layer, it is clear that L1 is different from L2.

The first layer and the second layer are thus in contact with each other on one side, namely in direct contact, wherein one side of the first layer touches one side of the second layer. The second layer is positioned in the floor panel under the first layer. The absolute value of L1-L2 is 12.56 and L2<L1.

The larger of L1 and L2 is equal to 40.39.

S1 and S2 are each less than 25. The absolute value of the difference of the saturation values (|S1-S2|) is 3.88.

The hue of the first colour is characterized by an angle H1 and the hue of the second colour is characterized by an angle H2. The smallest angle between H1 and H2 is 150°.

Alternative combinations are given below in Tables II and III.

TABLE II

| | CIE Lab | | | | | | | | |
|---|---|---|---|---|---|---|---|---|---|
| Layer # | L | a | b | L | a | b | L | a | b |
| | Alternative 1 | | | Alternative 2 | | | Alternative 3 | | |
| 7 | 27.89 | 0.16 | 0.2 | 27.89 | 0.16 | 0.2 | 27.89 | 0.16 | 0.2 | Further layer |
| 5 | 30.46 | 0.11 | 0.11 | 30.46 | 0.11 | 0.11 | 30.46 | 0.11 | 0.11 | Further layer |
| 4 | 43.58 | −0.57 | −2.66 | 43.58 | −0.57 | −2.66 | 43.58 | −0.57 | −2.66 | First layer |
| 6 | 30.46 | 0.11 | 0.11 | 30.46 | 0.11 | 0.11 | 30.46 | 0.11 | 0.11 | Second layer |
| 34 | 45.2 | −0.56 | −2.44 | 42.06 | −0.5 | −2.57 | 42.78 | −0.5 | −2.43 | Further layer |

Expressed in the HSL colour space, it is

TABLE III

| | HSL | | | | | | | | |
|---|---|---|---|---|---|---|---|---|---|
| Layer # | H | S | L | H | S | L | H | S | L |
| | Alternative 1 | | | Alternative 2 | | | Alternative 3 | | |
| 7 | 0.00 | 0.76 | 25.69 | 0.00 | 0.76 | 25.69 | 0.00 | 0.76 | 25.69 | Further layer |
| 5 | 0.00 | 0.00 | 27.84 | 0.00 | 0.00 | 27.84 | 0.00 | 0.00 | 27.84 | Further layer |

TABLE III-continued

| | HSL | | | | | | | | | |
|---|---|---|---|---|---|---|---|---|---|---|
| | H | S | L | H | S | L | H | S | L | |
| Layer # | Alternative 1 | | | Alternative 2 | | | Alternative 3 | | | |
| 4 | 210.00 | 3.88 | 40.39 | 210.00 | 3.88 | 40.39 | 210.00 | 3.88 | 40.39 | First layer |
| 6 | 0.00 | 0.00 | 27.84 | 0.00 | 0.00 | 27.84 | 0.00 | 0.00 | 27.84 | Second layer |
| 34 | 205.71 | 3.29 | 41.76 | 214.29 | 3.52 | 39.02 | 210.00 | 2.97 | 39.61 | Further layer |

The substrate 2 of the floor panel 1 from the example in FIGS. 2 to 6 comprises a first and a second reinforcing layer 8 and 9, in this case glass-fibre layers, more particularly glass-fibre mats (non-woven). A first reinforcing layer 8 is located on the surface 10 of the foamed layer 4 facing the decoration 3 and together with the second reinforcing layer 9 encloses the foamed layer 4. The aforementioned second reinforcing layer 9 is located on the opposite surface 11 of the foamed layer 4, between the first layer 4 and the second layer 6.

The aforementioned decoration 3 comprises a printed pattern and shows a single wooden board. The printed pattern is applied on a thermoplastic film 12, namely a PVC film. The floor panel 1 has in addition a translucent or transparent wearing layer 13 that is applied on top of the aforementioned decoration 3.

The aforementioned non-foamed layers 5-6-7 comprise, in the example, a first non-foamed layer 5 and a second non-foamed layer 6, which in each case are next to the aforementioned surfaces 10 and 11 of the foamed layer 4, and, in this case, also next to the reinforcing layers 8 and 9. These first and second non-foamed layers 5 and 6 consist of similar thermoplastic material, namely PVC, as the foamed layer 4, but preferably comprise a higher content of fillers, such as lime or talc. The floor panel in FIG. 2 represents an example of a substrate 2, wherein said non-foamed layers 5 and 6 enclose the foamed layer 4.

Figure 2:
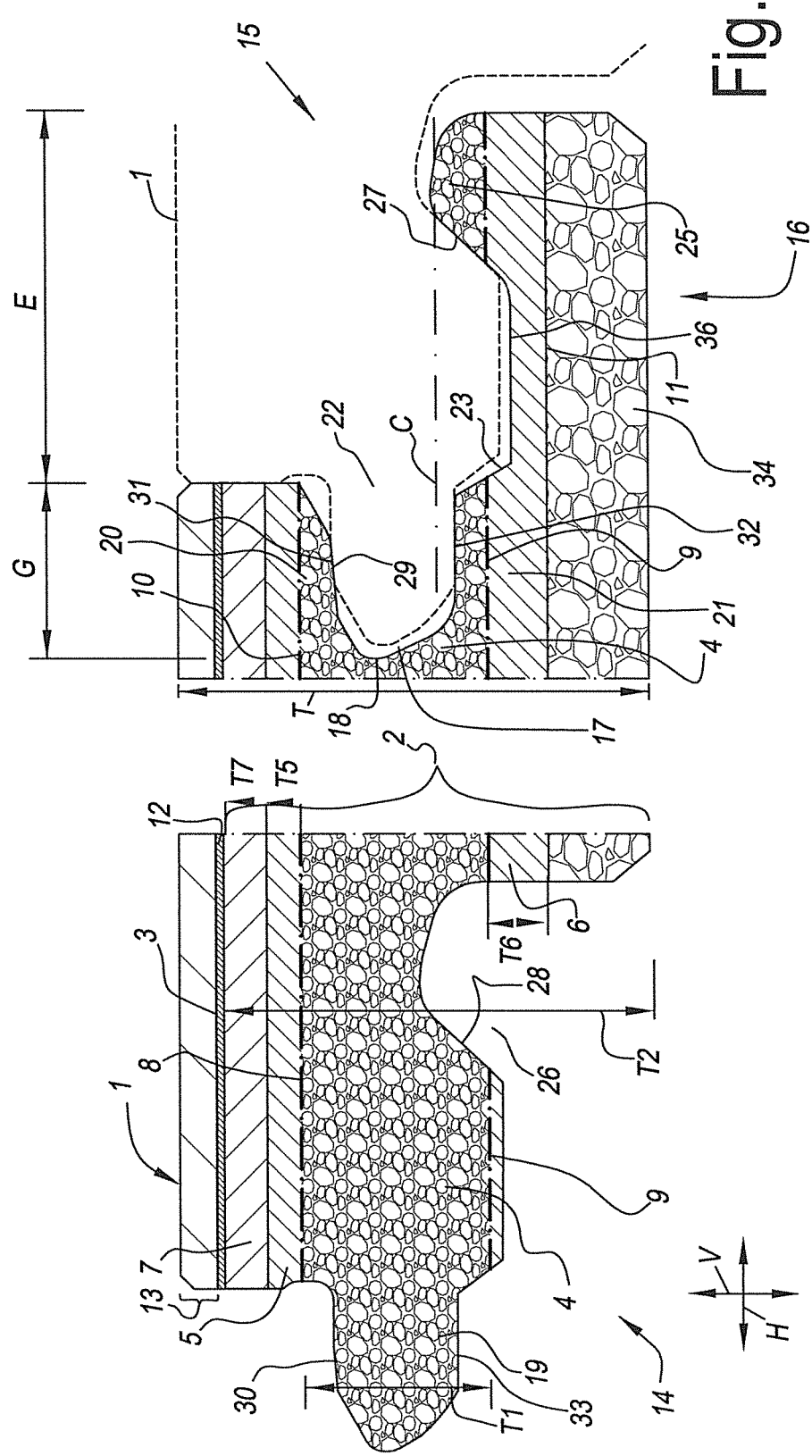

The substrate 2 in FIG. 2 further comprises yet a third non-foamed layer 7 of thermoplastic material, for example PVC. This third non-foamed layer 7 is located between the decoration 3 and the aforementioned non-foamed layer 5, and has a plasticizer content that is greater than the plasticizer content optionally present in the foamed layer 4 and/or is greater than the plasticizer content optionally present in the first and/or second non-foamed layer 5 and 6.

The non-foamed layer 6 is on the lower surface 11 of the foamed layer 4, namely the second non-foamed layer 6, and is made thicker than the aforementioned first foamed layer 5 on the upper surface 10 of the foamed layer 4, for example with a thickness T6 greater than 1.5 times the thickness T5 of the non-foamed layer 5. The sum of the thickness T5 of the non-foamed layer 5 and the thickness T7 of the non-foamed layer 7 is preferably roughly equal, greater than or equal to the thickness T6 of the non-foamed layer 6, preferably at least 10% greater, but less than 50% greater. In this way, the foamed layer 6 can optimally withstand any residual stresses in the non-foamed layer 5 and 7.

FIG. 2 shows an example of a floor panel 1 according to the invention that is provided with an additional foamed layer 34 on the underside of the substrate. Here, it is a foamed layer 34 of crosslinked polyethylene (XPE), which is glued to the other parts of the substrate, in particular to the non-foamed layer 6. In this case it is a flexible foam.

FIG. 2 also shows a first embodiment of the edge profiling. The upper surface 23 of the lower lip 21 is partially formed both in the material of the foamed layer 4 and in the material of the underlying non-foamed layer 6. In this case the reinforcing layer 9 on the lower surface 11 of the foamed layer 4 is interrupted at the location of the deepest zone 36 in the aforementioned upper surface 23. Preferably, as shown here, at the location of this deepest zone 36, at least half of the thickness of the whole of the non-foamed layers 6 is still maintained on the lower surface 11. The horizontal active contact surfaces 27 and 28 are for the most part formed on the material of the foamed layer 4, but also formed partly on the material of the underlying non-foamed layer 6. The reinforcing layer 9 is interrupted in the aforementioned lower lip 20, but intersects the aforementioned horizontal active contact surfaces 27 and 28.

In the example in FIG. 2, the lower surface 29 of the upper lip 20 is formed almost completely in the foamed part 4 of the substrate 2. In the coupled state, a first pair of vertical active contact surfaces 30-31 is formed on this part. A second pair of vertical active contact surfaces 32-33 is formed on the upper surface 23 of the lower lip 20, also on the material of the foamed layer 4. In this case the second pair of vertical active contact surfaces 32-33 is located at least partially, and here even completely, under the upper lip 21, namely in the groove 17 proper, or in other words proximal relative to the groove opening 22.

Thus, FIG. 2 shows a floor panel, provided with coupling means 16 that allow two such floor panels 1 to be coupled to each other, wherein on the relevant edges 14-15, locking is brought about at least in a vertical direction (V) perpendicular to the surface of the panels 1, wherein at least one of the aforementioned edges 15 is provided with a groove 17, the deepest point 18 of which is located in the first layer 4. This figure also shows a floor panel that is provided on at least two opposite edges 14-15 with coupling means 16 that allow two such floor panels 1 to be coupled to each other, wherein on the relevant edges 14-15, locking is brought about at least in a horizontal direction (H) in the surface of the panels 1 and perpendicular to the edges 14-15, wherein at least one of the edges 14-15 is provided with a hook-shaped locking part 25 directed upwards, wherein the locking part 25 extends at least partially into the first layer 4. This upwards-pointing hook-shaped locking part 25 extends at least partially into the second layer 6.

In this embodiment, the edges 14-15 are provided with a groove 17, wherein this groove 17 is flanked by an upper lip 20 and a lower lip 21 and wherein the upper surface 23 of the lower lip 21 is formed at least partially in the first layer 4 and also is formed at least partially in the second layer 6. The lower surface 29 of the upper lip 20 is formed at least partially, in this case wholly in the first layer 4.

At least one of the aforementioned edges 14 is provided with a tongue 19, said tongue being formed at least partially in the first layer 4. This tongue 19 is also partially formed in the second layer 6.

A wearing layer 13 is provided on top of the decorating layer 12. This wearing layer is a layer that comprises particles that increase wear resistance, such as corundum, and provides the floor panel with an outermost side.

Figure 3:
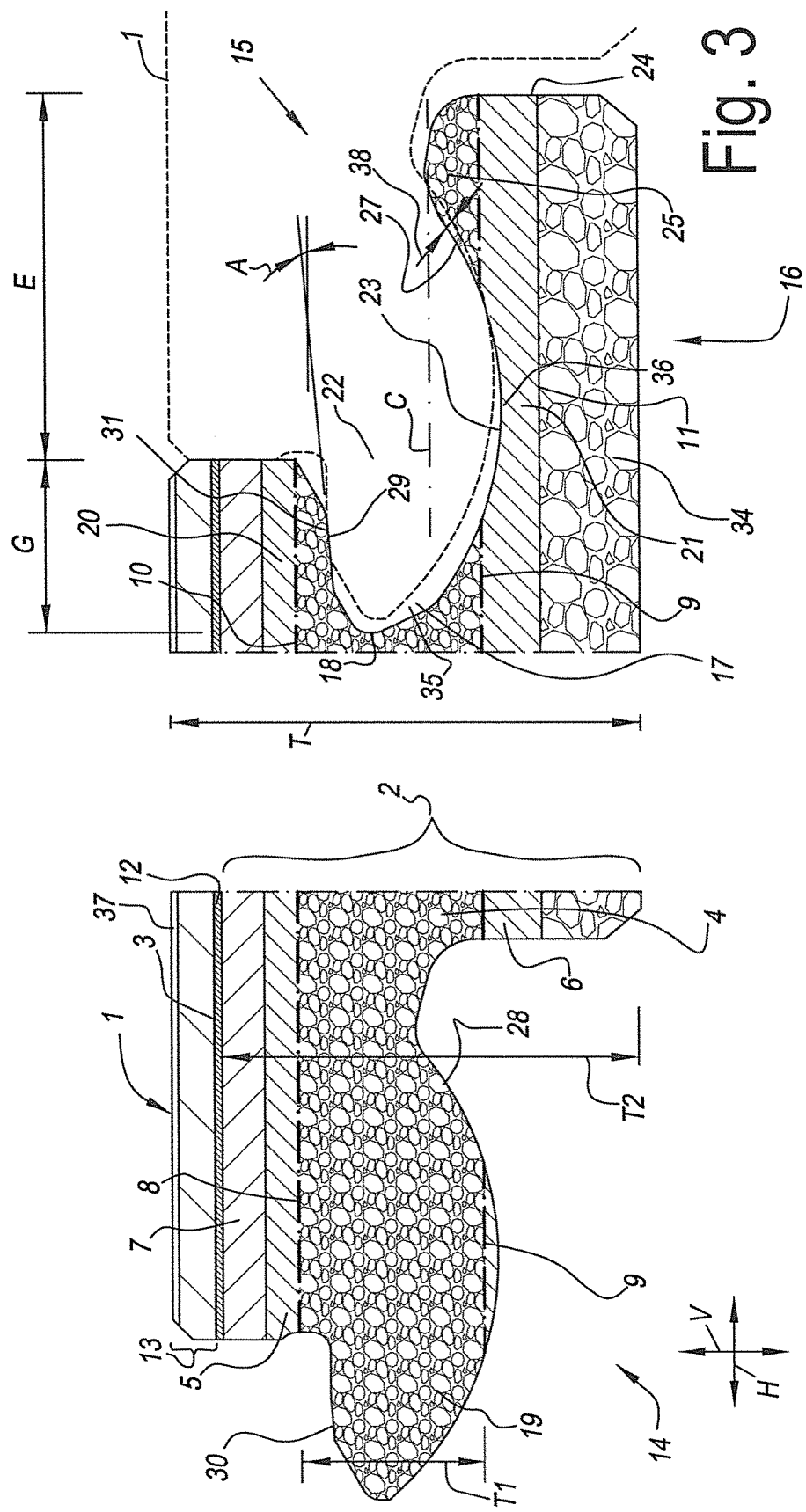

FIG. 3 shows, for the substrate 2, a similar layered structure as FIG. 2. On top of the decoration 3, in this case a wearing layer 13 is applied that also comprises a varnish surface coat 37. Any residual stresses in said varnish coat 37 have hardly any effect on the upper lip 21, since these parts have non-foamed layers 5-7 that are plasticizer-free, or have a plasticizer content below 12 phr, or better still below 7 phr. In addition, a reinforcing layer 8 extends continuously into this upper lip 20.

It is obvious that a varnish surface coat 37 may form part of the wearing layer 13 of any embodiment of floor panels 1 according to the present invention.

In the case of FIG. 3, the edge profiling comprises coupling means 16 with, on the tongue side 14, a convex underside, and, interacting with it, a concave upper surface 23 of the lower lip 20 on the groove side 15. At the location of the horizontal active contact surfaces 27-28, an overlap 38 is provided in the contour of the coupling means 16, so that in the coupled state a stress develops at least on these horizontal active contact surfaces 27-28. For the vertical active contact surfaces 30-31 on the upper side of the tongue 19 and the underside of the upper lip 20, a stress may also develop, either owing to a local overlap in the contour at this position, or because the aforementioned overlap 38 at the location of the horizontal active contact surfaces 27-28 creates a stress that has an effect on the vertical active contact surfaces 30-31. The latter is preferably achieved by inclining the vertical active contact surfaces 30-31 somewhat, as is the case here. Preferably these vertical active contact surfaces 30-31, in such a case and viewed overall, form an angle A in the range from 2° to 15°.

It is clear that this inclination of the first pair of vertical active contact surfaces 30-31 may be applied in any floor panel 1 with the features of the invention, independently of whether or not an overlap 38 is applied in the contour of the coupling means 16. Moreover, FIGS. 1 to 9 only form examples of the application of a slight inclination, namely of less than 10°. In the example in FIG. 10, an inclination greater than 10° is applied, but still always less than 45°, i.e. in the example about 30°.

Furthermore, it is clear that an overlap 38 at the location of the horizontal active contact surfaces 27-28 may also be applied in any floor panel 1 with the features of the present invention.

FIG. 4 shows an alternative embodiment of the floor panel in FIG. 2, with an alternative configuration of the coupling means.

FIG. 5 shows an example wherein the substrate 2 is of similar structure to that in FIG. 3, except for the additional foamed layer 34 on the underside of the substrate 2. Whereas in FIG. 3 the vertical active contact surfaces 30-31 and the horizontal active contact surfaces 27-28 are formed on the material of the foamed layer 4, in the case of FIG. 4 the vertical active contact surfaces 30-31 are formed on a non-foamed layer 5 present on the upper surface 10 of the foamed layer 4. Whereas in FIG. 3 the reinforcing layer 9 in the lower lip 21 is interrupted, it extends continuously in the lower lip 21 of the embodiment in FIG. 4. The overlap 38 of the contours, made on the hook-shaped part 25 in FIG. 4, is more limited than in the case of FIG. 3.

FIG. 6 shows an example in which the layer 7 is omitted. The edge profiling has the same form as in FIG. 3, but configured here in such a way that the upper surface 23 of the upper lip 20 is formed for the most part in the non-foamed layer 6 present on the lower surface 11 of the foamed layer 4. The horizontal active contact surfaces 27-28 on the hook-shaped part 25 are formed both in the material of the aforementioned foamed layer 4, and in the material of the underlying non-foamed layer 6. The reinforcing layer 9 is interrupted in the aforementioned lower lip 21, but in this case cuts the aforementioned horizontal active contact surfaces 27-28 roughly in two. Preferably, as shown here, at the location of the deepest zone 36 in the upper surface 23 of the lower lip 21, still at least half of the thickness of the whole of the non-foamed layers 6 is maintained on the lower surface 11 of the foamed layer 4.

The floor panels according to FIGS. 2 to 6 have edges formed by milling, sawing and grinding of panels with a beam shape. Owing to the relatively small colour difference between the layers, less colour difference is visible between the zones made from different layers. As a result, the transition between a lighter and a darker zone will be less visually perceptible.

The examples in FIGS. 2 to 6 are shown with foamed or non-foamed layers. Alternative examples are those wherein the layers have identical colours, but wherein none of the layers is foamed.

Moreover, if a part or surface of the coupling means should be formed in the first layer, but the perimeter of the shape comes very close to the boundary of the two layers, a slight deviation of the forming may ensure that a particle of or a small piece of the surface of the coupling means is nevertheless formed in the other layer. The fading of the colours, and greater fading of the dark colour than the lighter colour, will ensure a uniform colour effect along the part or surface of the coupling means. Thus, slight deviations from the intended ideal profile become less visually perceptible.

It is clear that although the embodiments and/or the materials for implementing embodiments according to the present invention have been discussed, various changes or alterations may be applied while departing from just scope and/or the spirit of the present invention. The present invention is by no means limited to the embodiments described above, but may be implemented according to different variants while remaining within the scope of the present invention.

The invention claimed is:

1. A floor panel comprising:
at least a substrate and a top layer,
wherein the substrate comprises at least one first layer of a first thermoplastic material and a second layer of a second thermoplastic material,
wherein the second layer is adjacent to a first side of the first layer,
wherein the first layer is characterized by a first colour with luminance value L1 in the HSL colour space and the second layer is characterized by a second colour with luminance value L2 in a HSL (Hue Saturation Lightness) colour space and wherein L1 is different from L2.

2. The floor panel according to claim 1, wherein the absolute value of L1-L2 is less than or equal to 50.

3. The floor panel according to claim 1, wherein L2<L1.

4. The floor panel according to claim 1, wherein the larger of L1 and L2 is less than or equal to 85.

5. The floor panel according to claim 1, wherein the second layer is positioned under the first layer in the floor panel.

6. The floor panel according to claim 1, wherein the first colour has a saturation value S1 in the HSL colour space and the second layer has a saturation value S2 in the HSL colour space, and where S1 and S2 are each less than or equal to 25.

7. The floor panel according to claim 1, wherein a hue of the first colour is characterized by an angle H1 in the HSL colour space and the hue of the second colour is characterized by an angle H2 in the HSL colour space and where the smaller angle between H1 and H2 is less than or equal to 175°.

8. The floor panel according to claim 1, wherein the thermoplastic material of the first layer is PVC, and wherein the thermoplastic material of the second layer is PVC.

9. The floor panel according to claim 1, wherein the panel comprises one or more further layers of thermoplastic material that are only present on the second side of the first layer in the floor panel, wherein each of the one or more further layers of thermoplastic material is characterized individually by a luminance value Lx.

10. The floor panel according to claim 9, wherein for each of the one or more layers the colour has a luminance value Lx that is different from L1.

11. The floor panel according to claim 9, wherein for at least one of the one or more layers the colour has a luminance value Lx that is identical to L2.

12. The floor panel according to claim 9, wherein each of the one or more further layers of thermoplastic material is characterized individually by a saturation value Sx, wherein each Sx is less than or equal to 25.

13. The floor panel according to claim 9, wherein each of the one or more further layers of thermoplastic material is characterized individually by a hue with angle Hx, wherein the smaller angle between H1 and each of the Hx is less than 175°.

14. The floor panel according to claim 9, wherein the largest of L1, L2 and all Lx is less than or equal to 85.

15. The floor panel according to claim 9, wherein all of the one or more further layers of thermoplastic material are located between the second side of the first layer of thermoplastic material and the upper surface of the floor panel.

16. The floor panel according to claim 1, wherein the top layer of the panel comprises a decorating layer, said decorating layer being located between the layers of thermoplastic material and the upper surface of the floor panel, wherein the decorating layer comprises a printed pattern.

17. The floor panel according to claim 16, wherein the decorating layer comprises a thermoplastic film, wherein the film is provided with a decorative print.

18. The floor panel according to claim 1, wherein the floor panel is arranged to, on at least two opposite edges, allow two such floor panels to be coupled together, wherein on the edges, locking is brought about at least in a vertical direction perpendicular to the surface of the panels, wherein at least one of the edges is provided with a groove, the deepest point is located in the first layer.

19. The floor panel according to claim 1, wherein the floor panel is arranged to, on at least two opposite edges, allow two such floor panels to be coupled together, wherein on the edges, locking is brought about at least in a vertical direction perpendicular to the surface of the panels, wherein at least one of the edges is provided with a groove, the deepest point is located in the second layer.

20. The floor panel according to claim 1, wherein the floor panel is arranged to, on at least two opposite edges, allow two such floor panels to be coupled together, wherein on the edges, locking is brought about at least in a horizontal direction in the surface of the panels and perpendicular to the edges, wherein at least one of the edges is provided with a hook-shaped locking part directed upwards, wherein the locking part extends at least partially into the first layer.

21. The floor panel according to claim 1, wherein the floor panel is arranged to, on at least two opposite edges, allow two such floor panels to be coupled together, wherein on the edges, locking is brought about at least in a horizontal direction in the surface of the panels and perpendicular to the edges, wherein at least one of the edges is provided with a hook-shaped locking part directed upwards, wherein the locking part extends at least partially into the second layer.

22. The floor panel according to claim 1, wherein the floor panel is arranged to, on at least two opposite edges, allow two such floor panels to be coupled together, wherein on the edges, locking is brought about at least in a vertical direction perpendicular to the surface of the panels, wherein at least one of the edges is provided with a groove, wherein this groove is flanked by an upper lip and a lower lip and wherein the upper surface of the lower lip is formed at least partially in the first layer.

23. The floor panel according to claim 1, wherein the floor panel is arranged to, on at least two opposite edges, allow two such floor panels to be coupled together, wherein on the edges, locking is brought about at least in a vertical direction perpendicular to the surface of the panels, wherein at least one of the edges is provided with a groove, wherein this groove is flanked by an upper lip and a lower lip and wherein the lower surface of the upper lip is formed at least partially in the first layer.

24. The floor panel according to claim 1, wherein the floor panel is arranged to, on at least two opposite edges, allow two such floor panels to be coupled together, wherein on the edges, locking is brought about at least in a vertical direction perpendicular to the surface of the panels, wherein at least one of the edges is provided with a groove, wherein this groove is flanked by an upper lip and a lower lip and wherein the lower surface of the upper lip is formed at least partially in the second layer.

25. The floor panel according to claim 1, wherein the floor panel is arranged to, on at least two opposite edges, allow two such floor panels to be coupled together, wherein on the edges, locking is brought about at least in a vertical direction perpendicular to the surface of the panels, as well as in a horizontal direction in the surface of the floor panels and perpendicular to the edges in question, wherein the locking in the vertical direction is provided by at least one pair of interacting contact surfaces partly formed in the first layer, whereas the locking in the horizontal direction is provided by at least one pair of interacting contact surfaces partly formed in the second layer.

* * * * *